Feb. 10, 1925.
A. DUMAS
1,526,207
LOCKING DEVICE FOR MOTOR VEHICLES
Filed June 18, 1923    3 Sheets-Sheet 1
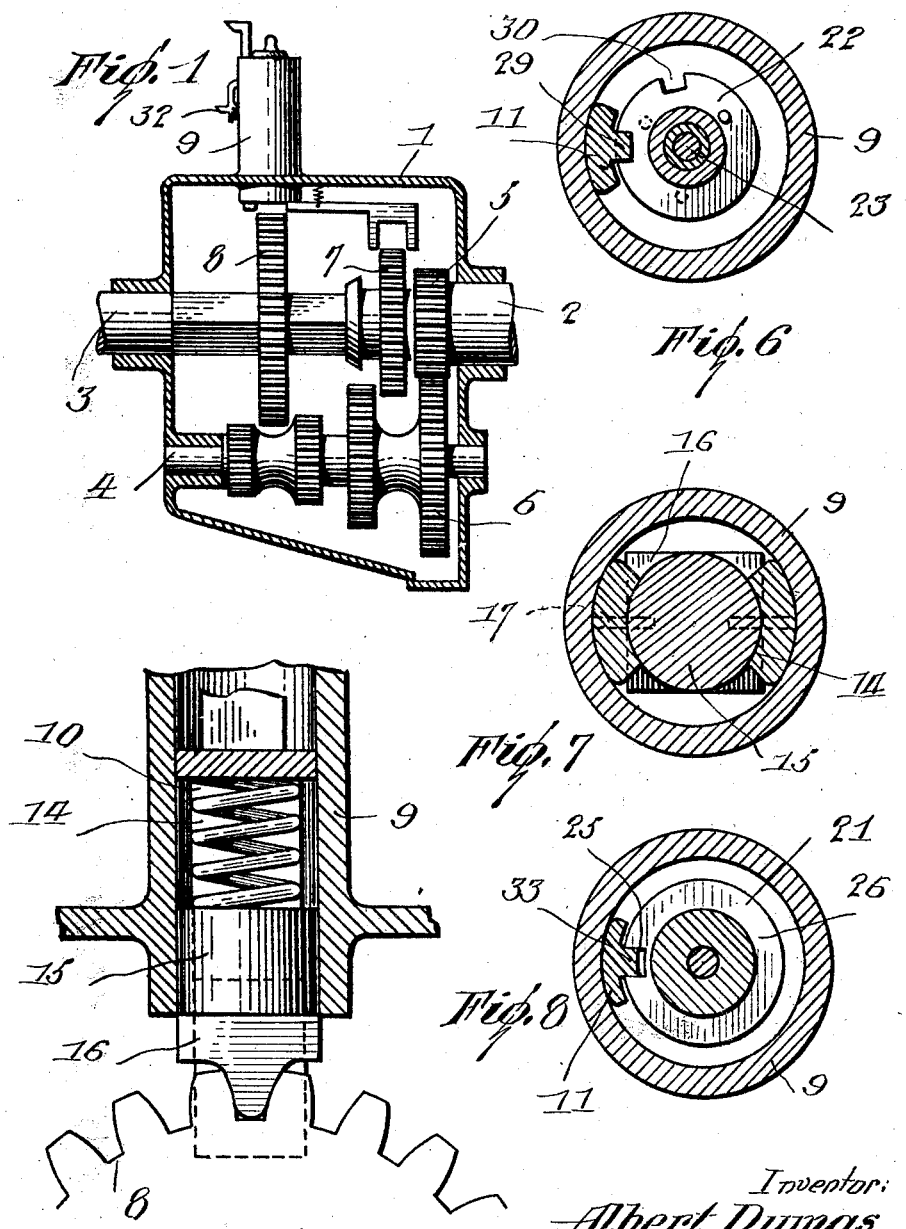
Inventor:
Albert Dumas
By William C Sinton
Attorney

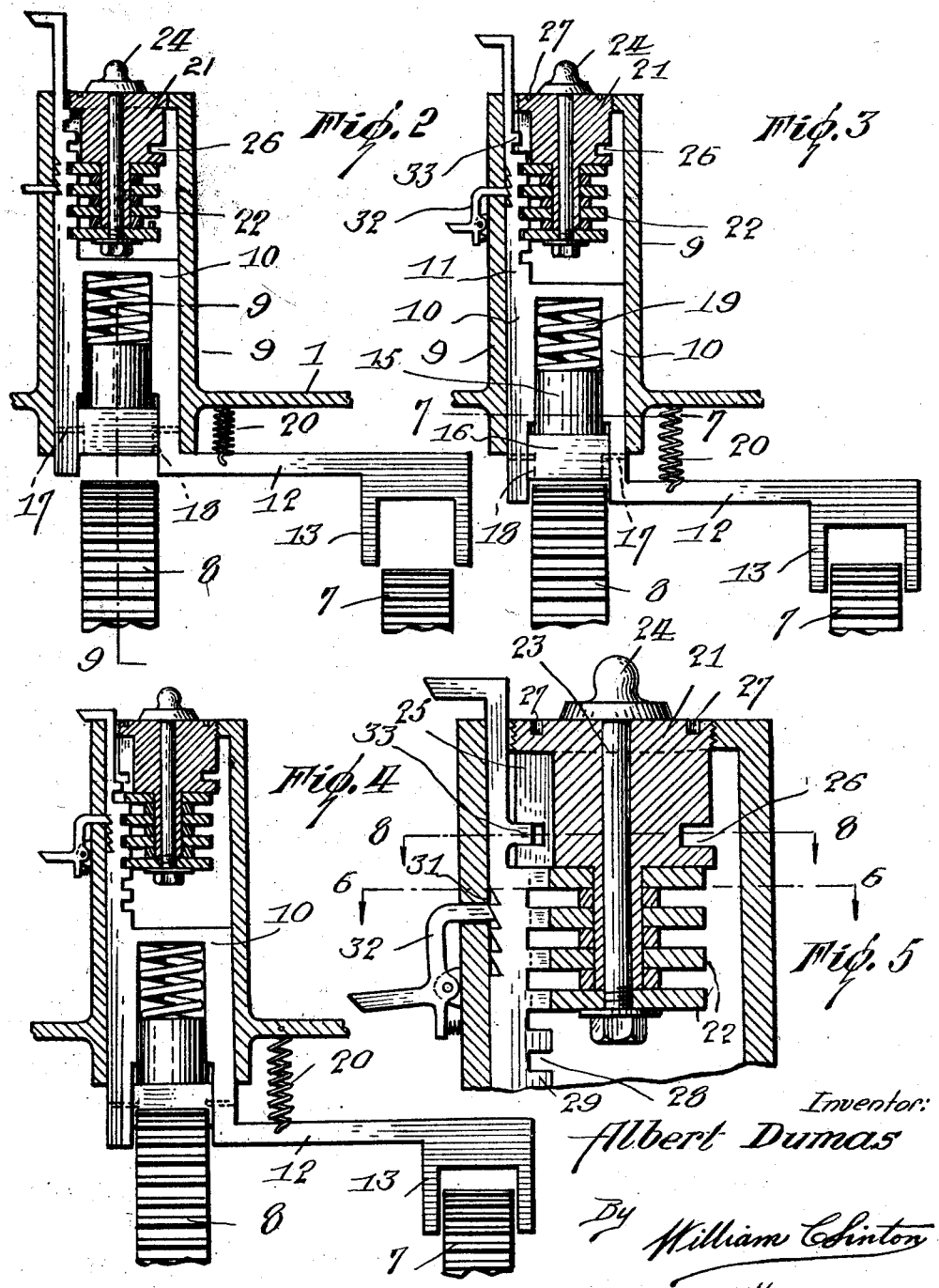

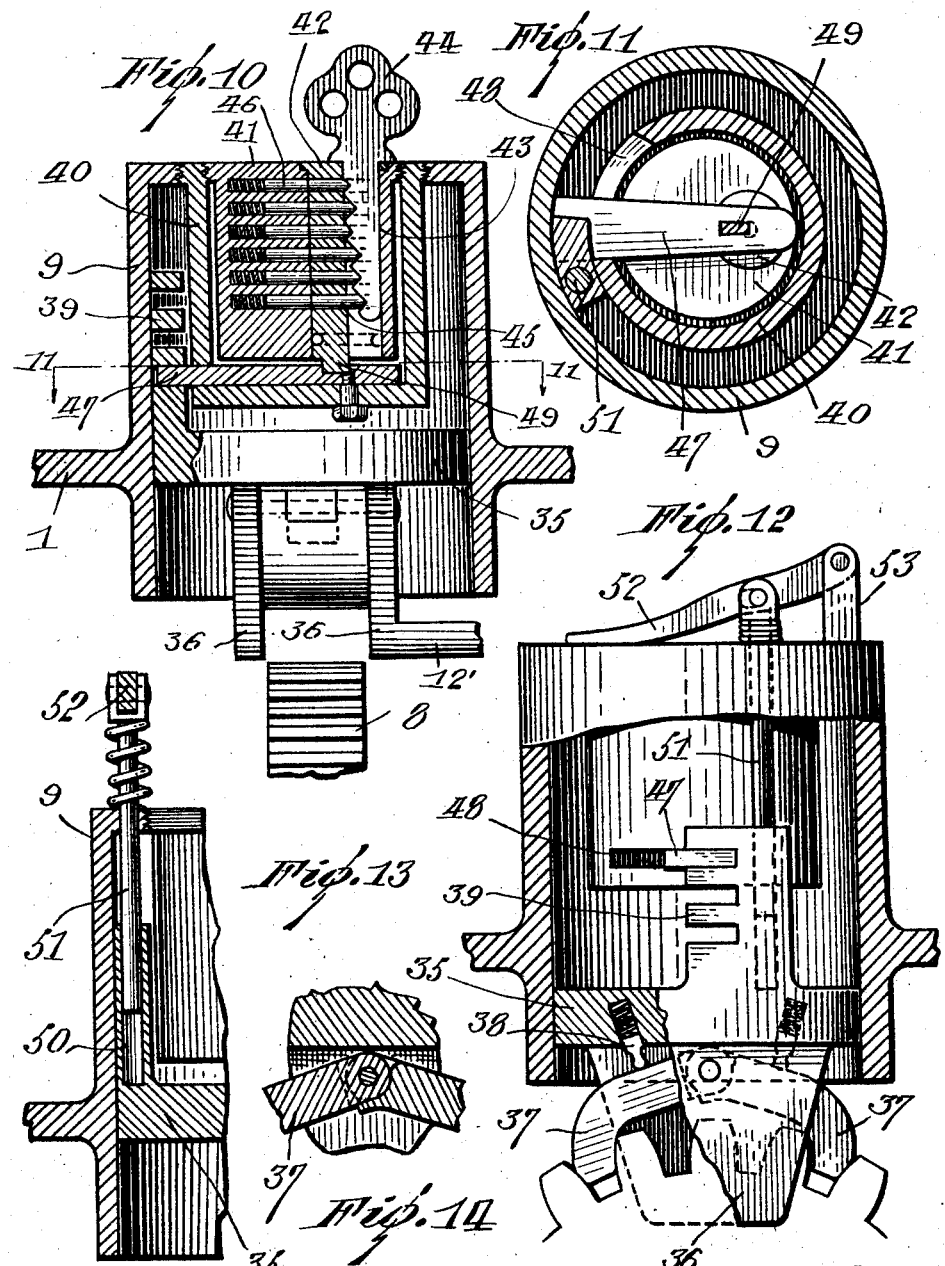

Patented Feb. 10, 1925.

1,526,207

UNITED STATES PATENT OFFICE.

ALBERT DUMAS, OF MANVILLE, RHODE ISLAND, ASSIGNOR TO DUMAS TRANSMISSION LOCK & MACHINERY COMPANY LIMITED, OF ST. JOSEPH DE SOREL, QUEBEC, CANADA.

LOCKING DEVICE FOR MOTOR VEHICLES.

Application filed June 18, 1923. Serial No. 646,276.

*To all whom it may concern:*

Be it known that I, ALBERT DUMAS, a subject of the King of Great Britain, residing at Manville, State of Rhode Island, U. S. A., have invented certain new and useful Improvements in Locking Devices for Motor Vehicles; and I do hereby declare that the following is a full, clear, and exact description of the invention, such as will enable others skilled in the art to which it appertains to make and use the same.

This invention relates to an improved locking device for motor vehicles, and generally considered involves a simple and effective means whereby the power transmission gearing of a motor driven vehicle may be positively locked so as to render power transmission to the rear axle impossible.

In the preferred embodiment of the invention it is proposed to provide a means for locking the transmission gearing, this means being of such construction that when the vehicle is in a garage, the connection between the operating motor and vehicle wheels may be rendered inoperative, while at the same time the wheels are free to rotate so that the vehicle may be moved freely about the garage.

The invention further includes the provision of a locking device for the drive gearing of a motor vehicle in which the combination or permutation type of lock may be employed so as to preclude the possibility of the mechanism being actuated and the gearing released for operation by unauthorized persons.

In accomplishing the purposes of the invention, there is provided a locking bar or fork adapted to straddle one of the sliding gears within the transmission casing. This part of the device prevents shifting of the sliding gears into operative position. The locking mechanism also includes a tooth adapted to engage one of the sliding gears so that the transmission shaft can receive no rotary motion whatever. When the tooth thus engages the sliding gear, the vehicle cannot even be moved by pushing, the wheels thus being locked against rotation with the transmission shaft.

The invention is fully disclosed in the following description and in the accompanying drawings in which:

Figure 1 is a vertical section through a transmission casing equipped with the improvement;

Figure 2 is a vertical section through the locking cylinder, the locking bar being in release position;

Figure 3 is a similar view with the locking bar in locking position and the tooth in release position;

Figure 4 is a similar view with both the locking bar and tooth in locking position;

Figure 5 is an enlarged vertical section of the upper part of the cylinder;

Figure 6 is a section on the line 6—6 of Figure 5;

Figure 7 is a section on the line 7—7 of Figure 3;

Figure 8 is a section on the line 8—8 of Figure 5;

Figure 9 is an enlarged section on the line 9—9 of Figure 2;

Figure 10 is a vertical section of the preferred form;

Figure 11 is a section on the line 11—11 of Figure 10;

Figure 12 is a side elevation with parts broken away;

Figure 13 is a detail vertical section; and,

Figure 14 is a similar section of the joint between the locking jaws.

In the above views in which like reference characters are employed to designate corresponding parts throughout, the numeral 1 indicates the usual housing in which are rotatably supported the power shaft 2 driven by the engine, the transmission shaft 3, and the counter shaft 4. The power shaft has keyed thereto a main drive pinion 5 normally meshing with the largest counter shaft gear 6. Intermediate the power shaft and transmission shaft is located the usual clutch mechanism (not shown) for connecting these shafts as is well known in the art. Upon the transmission shaft are disposed sliding gears 7 and 8 adapted to be shifted into engagement with the counter shaft gears in the usual manner.

To the upper portion of the housing 1 is secured integrally or otherwise a cylindrical casing 9. An inverted U-shaped member 10 is slidably mounted within the lower portion of the casing and is formed at one of its upper corners with a rack 11, the purpose of which is pointed out below. From one of the legs of this member extends a locking bar 12 carrying a fork 13 adapted to straddle the gear 7, as illustrated in Figures 1, 2 and 3.

The inner surfaces of the legs of the U-shaped member 10 are concaved, as indicated by the numeral 14 in Figure 7, for the guidance of a cylindrical block 15. At the lower end of the block is formed a tooth 16 adapted to engage the gear 8, as shown in Figure 9. Pins 17 extend through the sides of the member 10 into grooves 18 formed partially along the sides of the tooth near the lower end thereof. A spring 19 is received within the member 10 bearing against the back thereof and the top of the block 15. This spring normally pushes the tooth downwardly, but the pin and groove arrangement between the tooth and the sides of the member 10 allows the tooth to be moved upwardly by the rotation of the gear 8 when the tooth is not positively locked in engagement therewith. A spring 20 between the top of the housing 1 and the bar 12 normally maintains the latter in raised or release position.

In the top of the cylinder 9 is screwed the body 21 of a permutation lock including rotatable disks 22 of the usual character. A bolt 23 passing through the body is fitted at its outer end with an operating knob 24 by means of which this locking mechanism is actuated. The body is formed with a longitudinal slot 25 and with a circumferential groove 26, as shown in Figure 5. In the top of the body is formed a pair of depressions 27 for the reception of a key by means of which the lock may be removed for repair or replacing. The rack 11 has its inner edge cut to form a plurality of notches 28 and teeth 29. The disks 22 are also formed with aligned notches 30 adapted to receive the teeth 29 so that the rack may be moved longitudinally of the body when the parts are in the position shown in Figure 5.

The outer edge of the rack is cut with a series of notches 31 for the reception of a dog 32 pivoted to the outer surface of the casing 9 and adapted to lock the rack in adjusted positions of elevation. It is obvious that movement of the rack determines the position of the locking fork 13 and tooth 16.

In order that the rack 11 may be released when the lock body 21 is removed as described above, the rack is formed with an additional lug 33 receivable within the circumferential groove 26.

The purpose of the slot 25 is to allow for the longitudinal movement of the lug on the rack in adjusting the gear locking parts. Thus, when the lock is to be withdrawn, the disks are turned to such position that the notches 30 thereof contain the teeth 29, the body 21 being so disposed that the lug 33 is not within the slot 25 but only in the groove 26. When the lock body is now pulled outwardly with one hand, the dog 32 being released with the other hand, the rack will move outwardly with it, being locked thereto because of the engagement of the lug 33 in the groove 26. If, during the outward movement of the lock body, the disks 22 were not locked with the teeth 29, they would tend to rotate into the notches 28 in passing them, whereby the withdrawal of the body would be retarded. In the operation as described, however, the lock body and rack move simultaneously outwardly until the bar 12 engages the bottom of the casing 9. When the parts are in this position, similar to that shown in Figure 2, the unscrewed body may be tilted and then pulled out of the casing.

The preferred form shown in Figures 10 to 14 includes as in the first modification a cylinder 9 associated with the transmission casing. Within the cylinder is slidably mounted a plunger 35 on the lower surface of which is formed a pair of spaced ears 36 adapted to straddle the gear 8. From one of these ears extends a locking bar 12′ extending to the member 12 of Figure 2. Between the ears are pivoted a pair of jaws 37 adapted to enter between the teeth of the gear, as illustrated in Figure 12. These members are normally pressed downwardly into engagement with the gear by means of spring pressed fingers 38 mounted in the plunger. A rack 39 extends upwardly from the plunger and corresponds to the member 10 of the previous modification. Within the cylinder is mounted a lock barrel 40 in which is contained a lock body 41. A revolving plug 42 is mounted within the body in a manner well known in the art. The plug is formed with a longitudinal slot 43 for the reception of a key 44 and contains slidable pins 45 adapted to enter the slot and engage the notches of the key. These pins are normally pressed inwardly by spring pressed followers 46 in the body. To the base of the barrel is pivoted a tongue 47 the outer end of which extends through a slot 48 formed in the wall of the cylinder. This tongue is adapted for engagement in the notches of the rack and is actuated by means of a lug 49 extending therein from the lower end of the revolving plug.

For adjusting the position of the rack, the latter is formed with a bore 50 in which is tightly wedged a stem 51. The upper end of this member is pivoted to an intermediate point of an operating lever 52 which in turn is pivoted to a lug 53 on the top of the cylinder. When it is desired to securely lock the gear 8 against rotation, the tongue 47 is first threaded from the rack so that the latter may be moved to its lowermost position, as indicated in Figure 12, and the tongue is entered into the upper notch.

The jaws 37 obviously penetrate as far as possible into the spaces between the teeth of the gear. If it is desired to lock the gear so that it cannot be driven from the engine but will permit the wheels to turn if the vehicle is pushed, as in a garage, the tongue is inserted in the intermediate notch of the rack. In this position the ends of the jaws engage the extremities of the gear teeth and enable the gear to slip if the vehicle is pushed. The gear is free to rotate in any manner when the tongue is received in the lowest notch of the rack.

The wedge action between the stem 51 and the plunger prevents breaking of the lock if the upper end of the stem is hammered. If the stem were rigidly secured to the plunger, the latter would be forced downwardly and would break the lock; but in the present construction the stem would merely move farther into the bore 50.

While specific embodiments of the invention have been illustrated and described, it is to be understood that various alterations in the details of construction may be made without departing from the spirit of the invention as indicated by the appended claims.

Having thus fully described the invention, what I claim as new and desire to protect by Letters Patent is:—

1. For use with a transmission housing including a transmission shaft having sliding gears arranged thereon, and a casing formed upon said housing, a locking device comprising a slidable member within said casing, an arm extending from said member and formed with a fork adapted to straddle one of said gears to prevent it from sliding, a tooth associated with said slidable member and adapted to engage another of said sliding gears upon further actuation of the member, a toothed rack extending from said sliding member through said casing, a combination lock supported by said casing, said lock including a plurality of rotatable disks receivable between the teeth of the rack.

2. For use with a transmission housing including a transmission shaft having sliding gears arranged thereon and a casing formed upon said housing, a locking device comprising a slidable member within said casing, an arm extending from said member and formed with a fork adapted to straddle one of said gears to prevent it from sliding, a tooth associated with said slidable member and adapted to engage another of said sliding gears upon further actuation of the member, a toothed rack extending from said sliding member through said casing, a combination lock removably supported by said casing, said lock including a plurality of rotatable disks receivable between the teeth of the rack, said disks being notched whereby they may pass the teeth of the rack upon removal of the lock.

3. For use with a transmission housing including a transmission shaft having sliding gears arranged thereon and a casing formed upon said housing, a locking device comprising a slidable member within said casing, an arm extending from said member and formed with a fork adapted to straddle one of said gears to prevent it from sliding, a tooth associated with said slidable member and adapted to engage another of said sliding gears upon further actuation of the member, a toothed rack extending from said sliding member through said casing, a combination lock supported by said casing, said lock including a plurality of rotatable disks receivable between the teeth of the rack, the body of said lock being formed with a longitudinal slot and a circumferential groove, a lug formed on the rack and adapted for reception within said slot and groove whereby the rack may be withdrawn upon removal of the lock.

4. For use with a transmission housing including a transmission shaft having sliding gears arranged thereon and a casing formed upon said housing, a locking device comprising a slidable member within said casing, an arm extending from said member and formed with a fork adapted to straddle one of said gears to prevent it from sliding, a tooth associated with said slidable member and adapted to engage another of said slidable gears upon further actuation of the member, a toothed rack extending from said sliding member through said casing, a combination lock removably supported by said casing, said lock including a plurality of rotatable disks receivable between the teeth of the rack, said disks being notched whereby they may pass the teeth of the rack upon removal of the lock, the body of said lock being formed with a longitudinal slot and a circumferential groove, a lug formed on the rack and adapted for reception within said slot and groove whereby the rack may be withdrawn upon removal of the lock.

In witness whereof, I have hereunto set my hand.

ALBERT DUMAS.